United States Patent
Shin et al.

(10) Patent No.: US 10,493,514 B2
(45) Date of Patent: Dec. 3, 2019

(54) HOT STAMPING APPARATUS AND METHOD FOR PREVENTING PLATING FROM STICKING TO MOLD

(71) Applicant: HYUNDAI STEEL COMPANY, Incheon (KR)

(72) Inventors: Nam-Kyu Shin, Busan (KR); Seung-Man Nam, Seoul (KR); Myeong-Jin Lee, Gyeonggi-do (KR); Yun-Tae Kim, Chungcheongnam-do (KR)

(73) Assignee: Hyundai Steel Company, Incheon (KR)

( * ) Notice: Subject to any disclaimer, the term of this patent is extended or adjusted under 35 U.S.C. 154(b) by 305 days.

(21) Appl. No.: 15/619,032

(22) PCT Filed: Dec. 15, 2014

(86) PCT No.: PCT/KR2014/012327
§ 371 (c)(1),
(2) Date: Jun. 9, 2017

(87) PCT Pub. No.: WO2016/093410
PCT Pub. Date: Jun. 16, 2016

(65) Prior Publication Data
US 2018/0117660 A1     May 3, 2018

(30) Foreign Application Priority Data
Dec. 11, 2014 (KR) .......................... 10-2014-0178787

(51) Int. Cl.
*B21D 37/18* (2006.01)
*B21D 22/02* (2006.01)
(Continued)

(52) U.S. Cl.
CPC ............ *B21D 37/18* (2013.01); *B21D 22/022* (2013.01); *C09D 183/04* (2013.01); *B21D 22/00* (2013.01);
(Continued)

(58) Field of Classification Search
CPC ........ C21D 7/13; B21D 22/00; B21D 22/022; B21D 37/18; B21D 37/16; C09D 183/04; C08G 77/80
(Continued)

(56) References Cited

U.S. PATENT DOCUMENTS

| | | | |
|---|---|---|---|
| 2,869,227 A * | 1/1959 | Bradstreet | ................. B21J 1/06 29/424 |
| 9,302,312 B2 * | 4/2016 | Sachdev | ............. B21D 22/022 |
| 2018/0117660 A1 * | 5/2018 | Shin | ..................... B21D 22/022 |

FOREIGN PATENT DOCUMENTS

| | | |
|---|---|---|
| JP | 2006529002 A | 12/2006 |
| KR | 101033361 B1 | 5/2011 |
| KR | 20120048398 A | 5/2012 |

OTHER PUBLICATIONS

International Search Report dated Aug. 3, 2015, issued by the Korean Intellectual Property Office as the ISA, in corresponding PCT Patent Application No. PCT/KR2014/012327.

* cited by examiner

*Primary Examiner* — David B Jones
(74) *Attorney, Agent, or Firm* — Locke Lord LLP; Daniel J. Fiorello (57) ABSTRACT

Disclosed is a hot stamping device and method for preventing plating from sticking to a die. The hot stamping device may include a die that receives a heated plating material, presses the received plating material, and rapidly cools the pressed plating material in a constrained state. Before the plating material is pressed, an anti-sticking layer may be
(Continued)

formed on the surface of the die disposed in contact with the plating material.

5 Claims, 11 Drawing Sheets

(51) Int. Cl.
  *C09D 183/04* (2006.01)
  *C08G 77/00* (2006.01)
  *C21D 7/13* (2006.01)
  *B21D 22/00* (2006.01)
  *B21D 37/16* (2006.01)
(52) U.S. Cl.
  CPC .............. *B21D 37/16* (2013.01); *C08G 77/80* (2013.01); *C21D 7/13* (2013.01)
(58) Field of Classification Search
  USPC ............................................................ 72/42
  See application file for complete search history.

HOT STAMPING APPARATUS AND METHOD FOR PREVENTING PLATING FROM STICKING TO MOLD

CROSS REFERENCE TO RELATED APPLICATIONS

This application is the national phase under 35 U.S.C. § 371 of PCT International Application No. PCT/KR2014/012327, filed Dec. 15, 2014, which claims the benefit of and priority to Korean Patent Applications No. 10-2014-0178787 filed Dec. 11, 2014. The entire contents of this patent application are hereby incorporated by reference herein.

TECHNICAL FIELD

The present invention relates to a hot stamping device and method, and more particularly, to a hot stamping device and method for preventing plating from sticking to a die.

BACKGROUND ART

Conventionally, vehicle parts have been manufactured through the press forming method.

The method for manufacturing vehicle parts through the press forming method generally manufactures a product through a forming process and a finishing process. The forming process may include cutting the raw material of a cold or hot rolled coil, transferring the cut material into a press die, and pressing the material in the press die, and the finishing process may include trimming unnecessary portions and processing holes.

A steel plate processing method using the conventional press forming method is only to implement the shape of a part by processing the strength and property of a steel plate manufactured by a steel company.

Therefore, the property of the raw material corresponds to the property of the processed part. Thus, when the strength of the raw material is increased, it becomes difficult to perform press forming, thereby making it difficult to implement the precise shape of a product.

Since the recent automobile industry necessarily needs parts which require high strength and formability, the above-described problem of the forming process inevitably limits the application of a raw material with high strength.

The hot stamping method which has been recently introduced is performed at high temperature, while the conventional press forming method is performed at low temperature.

Since the elongation of a material significantly increases at high temperature, the material has no specific limitation in formability, and can achieve a required high-strength characteristic through a heat treatment effect.

Since the hot stamping processes are mostly performed at a high temperature of 900° C. or more, the high-temperature stability of the material serves as an important factor. For this property, a plated steel plate is generally used. For example, an Al—Si-plated steel plate is mainly used as a material used as a hot stamping material. Recently, research has been actively conducted on a variety of plated steel plates with a relatively low price, in addition to the Al—Si-plated steel plate.

Figure 1:
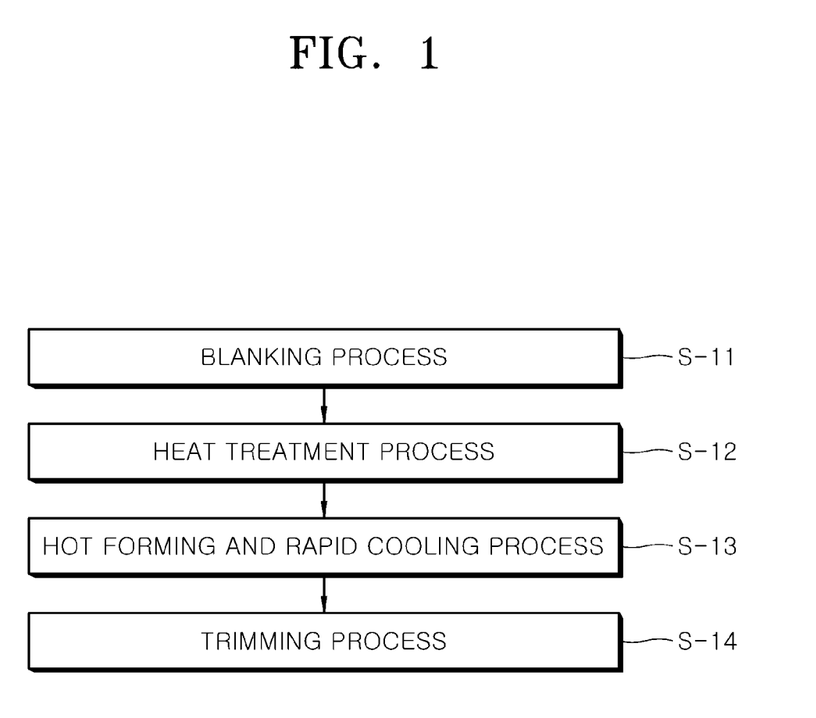
FIG. 1 is a flowchart simply illustrating a conventional hot stamping method.
Figure 2:
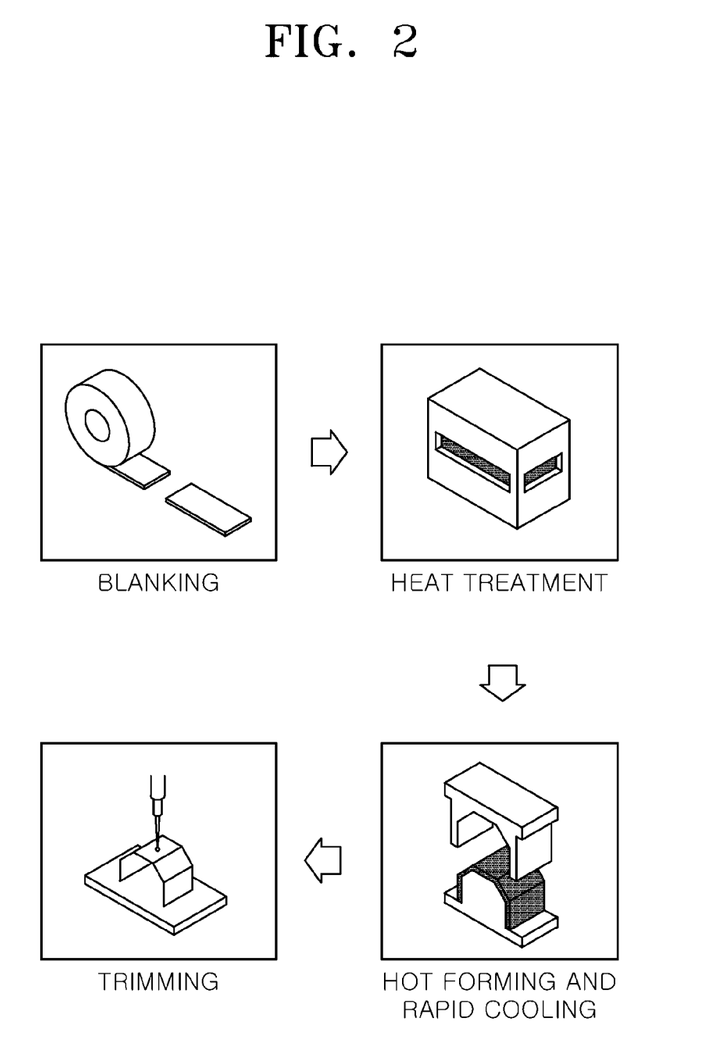
FIG. 2 is a process diagram simply illustrating the conventional hot stamping method.

FIG. 1 is a flowchart simply illustrating a conventional hot stamping method, and FIG. 2 is a process diagram simply illustrating the conventional hot stamping method.

Referring to FIGS. 1 and 2, the hot stamping method includes a blanking process S-11, a heat treatment process S-12, a hot forming and rapid cooling process S-13 and a trimming process S-14.

The blanking process S-11 is to cut a material into required sizes. The heat treatment process S-12 is to heat the blanked material in a predetermined temperature range. The hot forming and rapid cooling process S-13 is to rapidly cool the heated material while forming the heated material. The trimming process S-14 is to precisely cut the material formed and hardened through the hot forming and rapid cooling process, using laser equipment or the like.

However, when the hot stamping method is performed using the plated steel plate (for example, the Al—Si-plated steel plate), Al plating may stick to the die. The Al plating sticking to the die may cause a defect on the surface of the formed product (or part).

Figure 3:
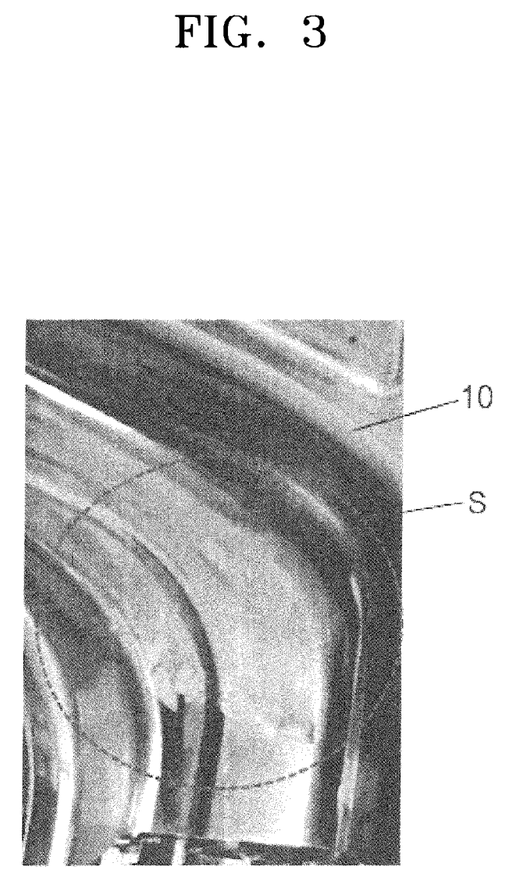
FIG. 3 is a photograph showing that Al plating has stuck to a die according to the conventional hot stamp method.

FIG. 3 is a photograph showing that sticking S occurred on the surface of a die 10, when a plated steel plate is used as the material by the conventional hot stamping method.

Figure 4:
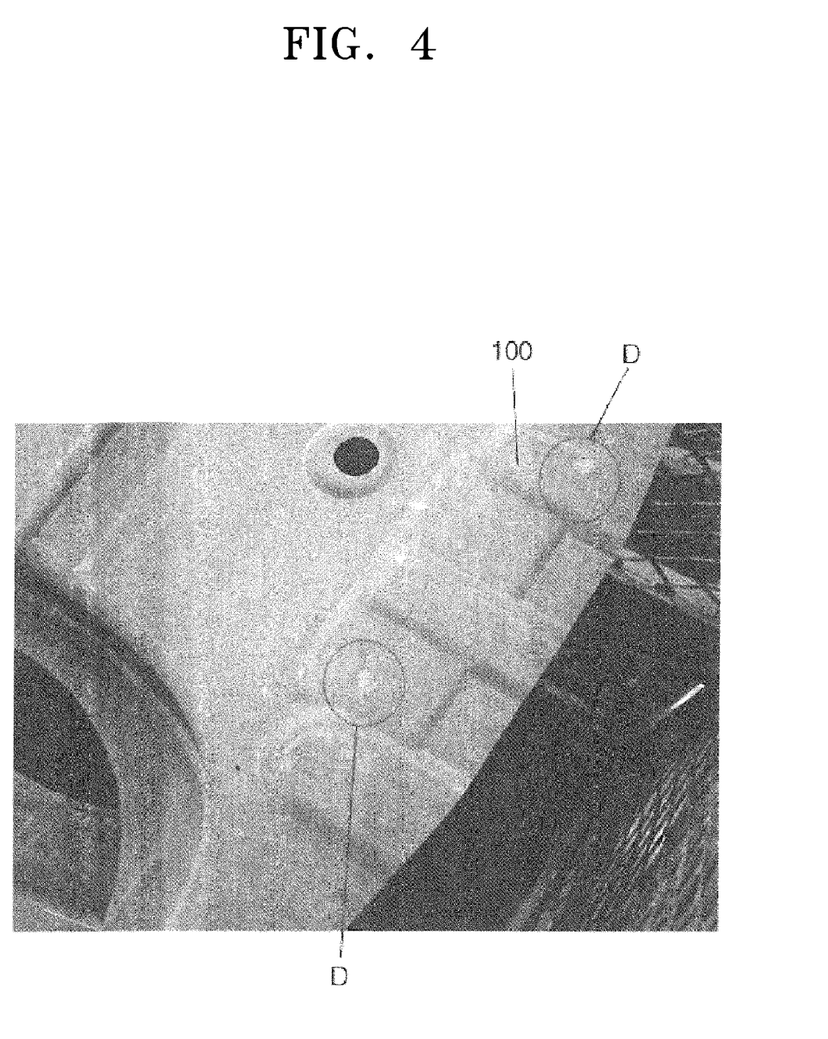
FIG. 4 is a photograph showing that dents have occurred on the surface of a part formed through the conventional hot stamping method.

FIG. 4 is a photograph showing that a plating defect D (also referred to as 'dent') has occurred on the surface of the formed product or part 100 after hot stamping, due to the sticking S which occurred on the surface of the die 10 in FIG. 3.

In particular, when the hot stamping method for local softening uses a plated steel plate as the material, Al plating may seriously stick to the surface of the die. In this case, an operator needs to stop the operation of the processing line, check the level of the sticking by checking the surface of the die, and remove the sticking.

The related art is disclosed in Korean Patent Registration No. 10-1033361 registered on Apr. 28, 2011 and entitled "Hot press forming method".

DISCLOSURE

Technical Problem

Various embodiments of the present invention are directed to a hot stamping device and method for preventing plating from sticking to a die, which can prevent plating from sticking to a die when a plated steel plate is used as a material of hot stamping, thereby improving the quality of a product or part formed through hot stamping.

Also, various embodiments of the present invention are directed to a hot stamping device and method for preventing plating from sticking to a die, which can prevent Al plating from sticking to a die when an Al-plated steel plate is used as a material of local-softening hot stamping.

Technical Solution

In an embodiment, there is provided a hot stamping device comprising a die that receives a heated plating material, presses the received plating material, and rapidly cools the pressed plating material in a constrained state. Before the plating material is pressed, an anti-sticking layer may be formed on the surface of the die disposed in contact with the plating material.

The die may include an upper die disposed over the plating material and a lower die disposed under the plating material, with the plating material interposed therebetween, and the anti-sticking layer may be formed by applying an anti-sticking agent onto one or more of the bottom surface of the upper die and the top surface of the lower die.

The anti-sticking agent may include 10-20 wt % of a methyl 2-phenyl propyl dodecyl methyl siloxane copolymer, 5-10 wt % of a C12-C14 secondary ethoxylated alcohol, and 75-85 wt % of water.

In another embodiment, there is provided a hot stamping device comprising a die that receives a heated plating material, presses the received plating material, and rapidly cools the pressed plating material in a constrained state. Before the plating material is pressed, an anti-sticking layer may be formed on the surface of the die disposed in contact with the plating material, and a cooling speed adjusting part may be formed on the surface of the die in order to cool the plating material at a different speed from the die.

The die may include an upper die disposed over the plating material and a lower die disposed under the plating material, with the plating material interposed therebetween, the anti-sticking layer may be formed by applying an anti-sticking agent onto one or more of the bottom surface of the upper die and the top surface of the lower die, and the cooling speed adjusting part may be symmetrically formed on both surfaces of the plating material.

The anti-sticking agent may include 10-20 wt % of a methyl 2-phenyl propyl dodecyl methyl siloxane copolymer, 5-10 wt % of a C12-C14 secondary ethoxylated alcohol, and 75-85 wt % of water.

In another embodiment, there is provided a hot stamping method for preventing plating from sticking to a die, using the hot stamping device. The hot stamping method may include the steps of: (a) blanking a plating material by cutting the plating material into predetermined sizes; (b) treating the plating material by heating; (c) forming an anti-sticking layer on the surface of a die disposed in contact with the plating material, before pressing the plating material; (d) hot forming and rapidly cooling the plating material, using the die having the anti-sticking layer formed thereon; and (e) trimming the formed product.

In the step (c), the die may include an upper die disposed over the plating material and a lower die disposed under the plating material, with the plating material interposed therebetween, and the anti-sticking layer may be formed by applying an anti-sticking agent onto one or more of the bottom surface of the upper die and the top surface of the lower die.

The anti-sticking agent may include 10-20 wt % of a methyl 2-phenyl propyl dodecyl methyl siloxane copolymer, 5-10 wt % of a C12-C14 secondary ethoxylated alcohol, and 75-85 wt % of water.

Advantageous Effects

In accordance with the embodiments of the present invention, when a product is formed through the hot stamping method using a plated steel plate, the hot stamping device and method can prevent plating from sticking from a die, thereby improving the quality of the product formed through the hot stamping while preventing a defect of the product.

In particular, during local-softening hot stamping, the hot stamping device and method can prevent Al plating from sticking to a die, thereby preventing a defect remaining as a dent on the surface of a product or part formed through hot stamping.

DESCRIPTION OF DRAWINGS

The above and other aspects, features and advantages of the invention will become apparent from the following detailed description in conjunction with the accompanying drawings, in which.

MODE FOR INVENTION

Embodiments of the present invention will hereinafter be described in detail with reference to the accompanying drawings.

Moreover, the detailed descriptions of publicly known functions or configurations will be ruled out in order not to unnecessarily obscure subject matters of the present invention.

Figure 5:
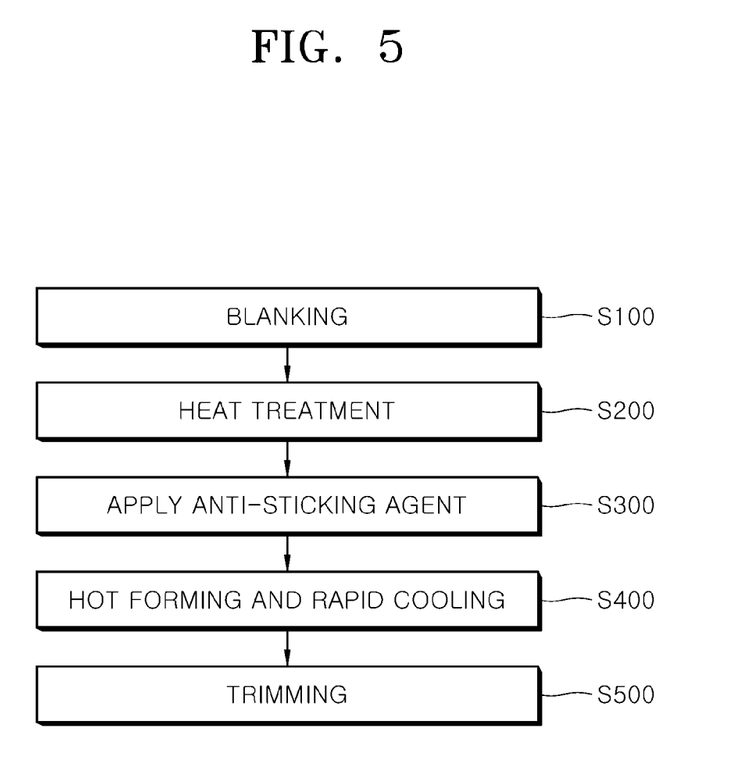
FIG. 5 is a flowchart simply showing a hot stamping method for preventing plating from sticking to a die in accordance with an embodiment of the present invention.

FIG. 5 is a flowchart simply illustrating a hot stamping method for preventing plating from sticking to a die in accordance with an embodiment of the present invention.

Referring to FIG. 5, the hot stamping method for preventing plating from sticking to a die in accordance with the embodiment of the present invention (hereafter, simply referred to as 'hot stamping method') may include a blanking step S100, a heat treatment step S200, an anti-sticking agent applying step S300, a hot forming and rapid cooling step S400 and a trimming step S500.

The blanking step S100 is to cut a plating material (for example, Al—Si-plated steel plate) into necessary sizes.

The heat treatment step S200 is to treat the plating material by heating.

The anti-sticking agent applying step S300 is to form an anti-sticking layer by applying an anti-sticking agent onto the surface of a die disposed in contact with the plating material, before hot stamping or pressing the plating material.

At this time, the anti-sticking agent applying step S300 and the anti-sticking layer 200 will be described in detail with reference to FIGS. 8 to 11.

The plating material may be provided as a product (or part) which has secured a desired shape and property through the hot forming and rapid cooling step S400 and the trimming step S500.

Figure 6:
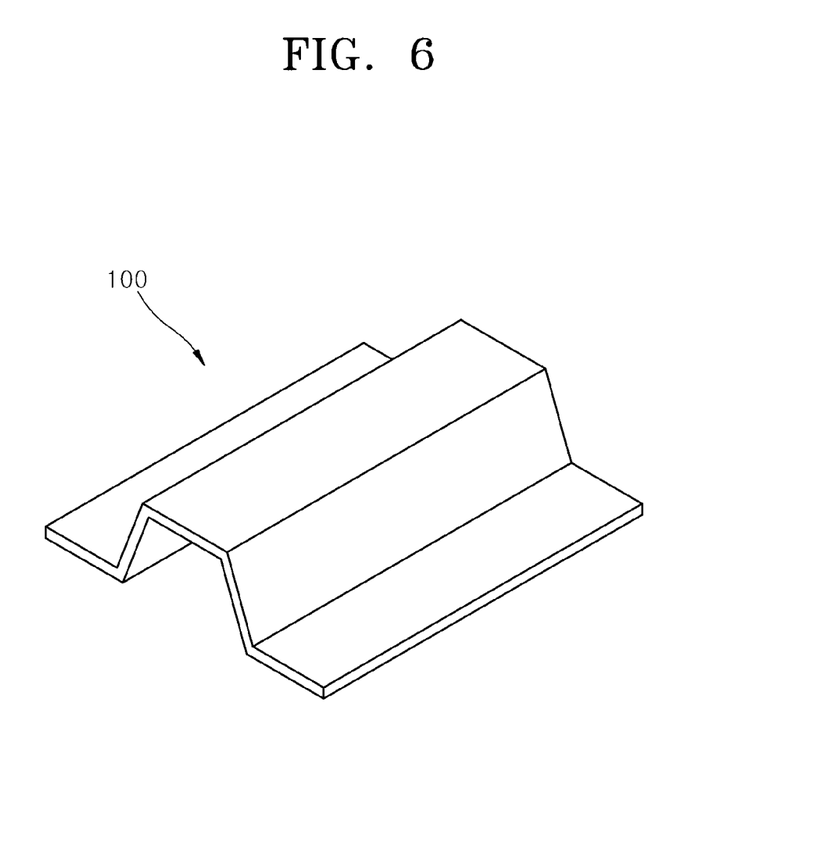
FIG. 6 is a diagram simply illustrating the shape of a product (or part) formed through the hot stamping method for preventing plating from sticking to a die in accordance with the embodiment of the present invention.

FIG. 6 is a diagram briefly illustrating the shape of a product (or part) formed through the hot stamping method for preventing plating from sticking to a die in accordance with the embodiment of the present invention.

The product or part 100 formed by the hot stamping method in accordance with the embodiment of the present invention may be used for various purposes. In particular, however, the product or part 100 may be used as a vehicle part in many cases, and not limited to a specific kind and shape.

When a plating material (for example, Al—Si-plated steel plate) is used, a phenomenon such as sticking S may occur on the die 10 (refer to FIG. 3) while the hot stamping method is used. As a result, the sticking may cause a plating defect (referred to as a dent D) on the surface of the product or part 100 (refer to FIG. 4).

Figure 7:
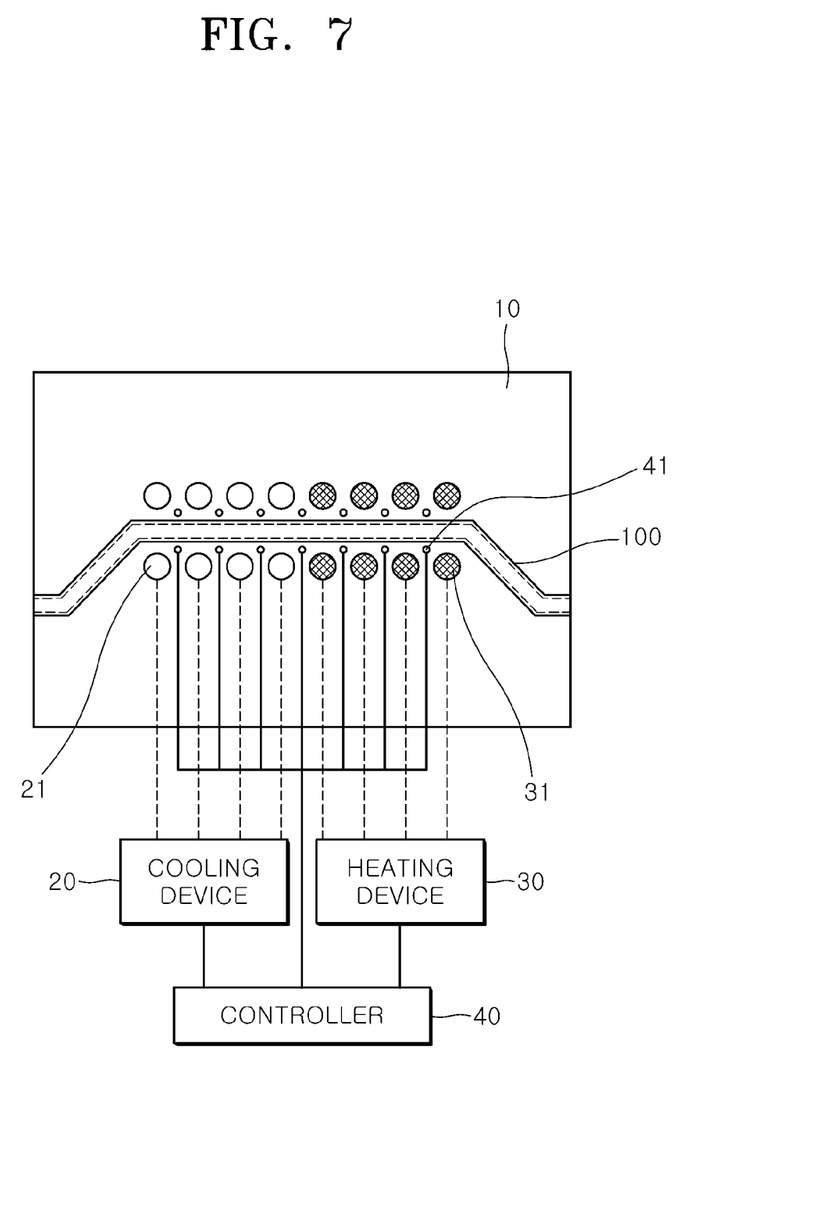
FIG. 7 is a diagram simply illustrating a local softening hot stamping device.

FIG. 7 simply illustrates a cross-sectional shape of a local-softening hot stamping device as an example of a hot stamping device in accordance with an embodiment of the present invention.

Referring to FIG. 7, the hot stamping device may include a die 10, and a cooling speed adjusting part. The die 10 may include upper and lower dies coupled to each other so as to form a forming space corresponding to the shape of a formed product to be processed, and the cooling speed adjusting part may include a cooling device 20 and a heating device 30 to control the cooling speed of the die.

The hot stamping device may further include a plurality of temperature sensors 41 and a controller 40 for controlling the cooling device 20 and the heating device 30 according to temperature values measured by the temperature sensors.

For example, the hot stamping device may heat a portion of the die 10, which is to be locally softened, at a predetermined temperature of 250 to 450° C., for example, in order to adjust the cooling speed before a product or part is hot-stamped through the die 10. At this time, the temperature gradient may be induced while the heated portion of the die is hardly cooled and a portion to be cooled is rapidly cooled.

FIGS. 8 to 11 are cross-sectional views illustrating various shapes in which an anti-sticking layer is formed in a die through the hot stamping method for preventing plating from sticking to a die in accordance with the embodiment of the present invention.

As illustrated in FIGS. 8 to 11, the hot stamping device in accordance with the embodiment of the present invention may include the die 10 which receives a heated plating material 100, presses the received plating material 100, and rapidly cools the pressed plating material 100 in a constrained state.

In particular, an anti-sticking layer 200 may be formed on the surface of the die 10, or specifically the surface of the die 10 disposed in contact with the plating material 100.

Figure 8:
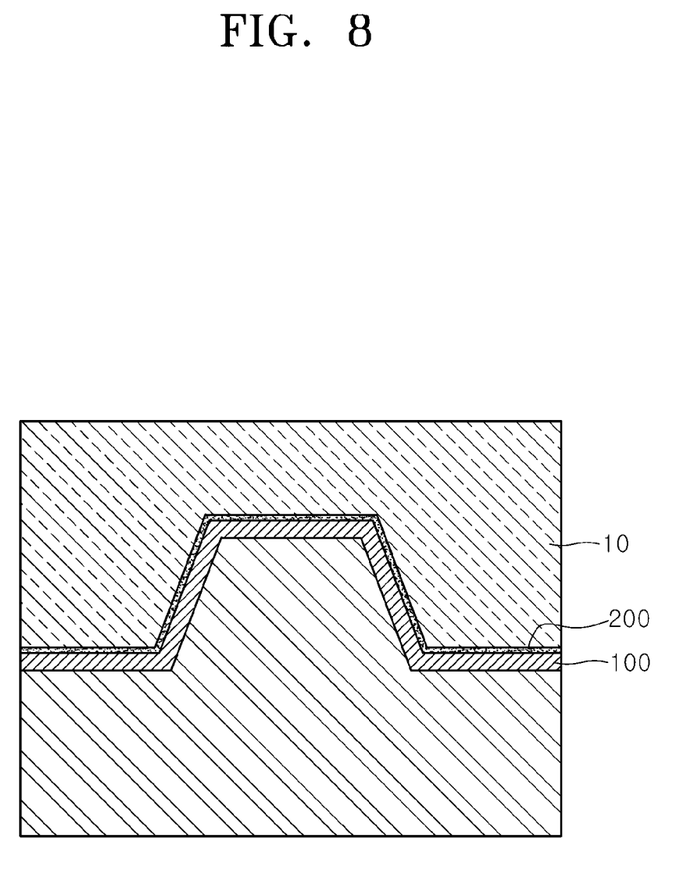
FIGS. 8 to 11 are cross-sectional views illustrating various shapes in which an anti-sticking layer is formed in a die through the hot stamping method for preventing plating from sticking to a die in accordance with the embodiment of the present invention.

Referring to FIG. 8, the die 10 may include upper and lower dies with the plating material 100 interposed therebetween. In other words, the upper die may be disposed over the plating material 100, and the lower die may be disposed under the plating material 100.

The anti-sticking layer 200 may be formed on one or more of the bottom surface of the upper die and the top surface of the lower die.

Figure 9:
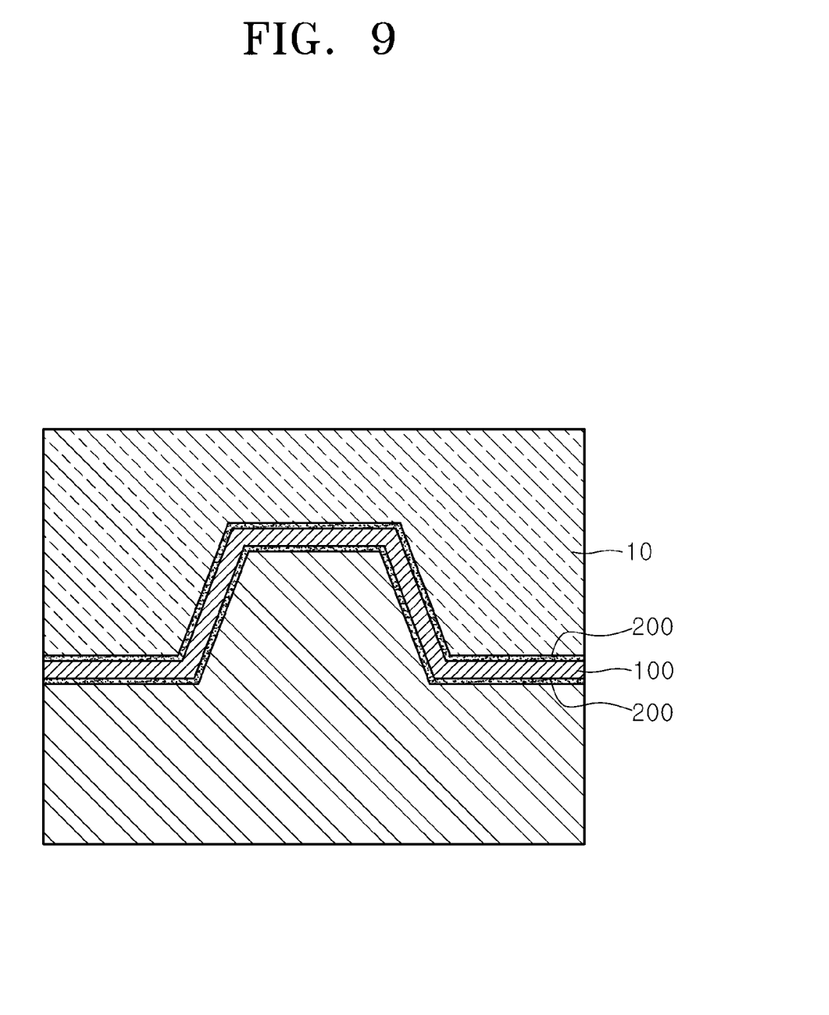

That is, FIG. 8 illustrates that the anti-sticking layer 200 is formed over the plating material 100 or on the bottom surface of the upper die, and FIG. 9 illustrates that the anti-sticking layer 200 is formed on each of the bottom surface of the upper die and the top surface of the lower die.

The anti-sticking layer 200 may be formed by a process in which an operator applies a predetermined functional solvent (hereafter, referred to as 'anti-sticking agent') onto the surface of the die 10, which comes in contact with the plating material 100, using a brush, or sprays the functional solvent onto the surface of the die 10 using a dedicated spray device. However, the applying method is not limited.

Desirably, the anti-sticking agent may include 10-20 wt % of a methyl 2-phenyl propyl dodecyl methyl siloxane copolymer, 5-10 wt % of a C12-C14 secondary ethoxylated alcohol, and 75-85 wt % of water.

As the anti-sticking layer 200 is applied to the contact portion between the die 10 and the plating material 100, the anti-sticking layer 200 can prevent Al plating of the plating material 100 from sticking to the surface of the die 10.

As a result, the anti-sticking layer 200 can prevent an occurrence of dent D on the product or part (refer to FIG. 4) formed through the hot stamping method using the plating material 100.

Figure 10:
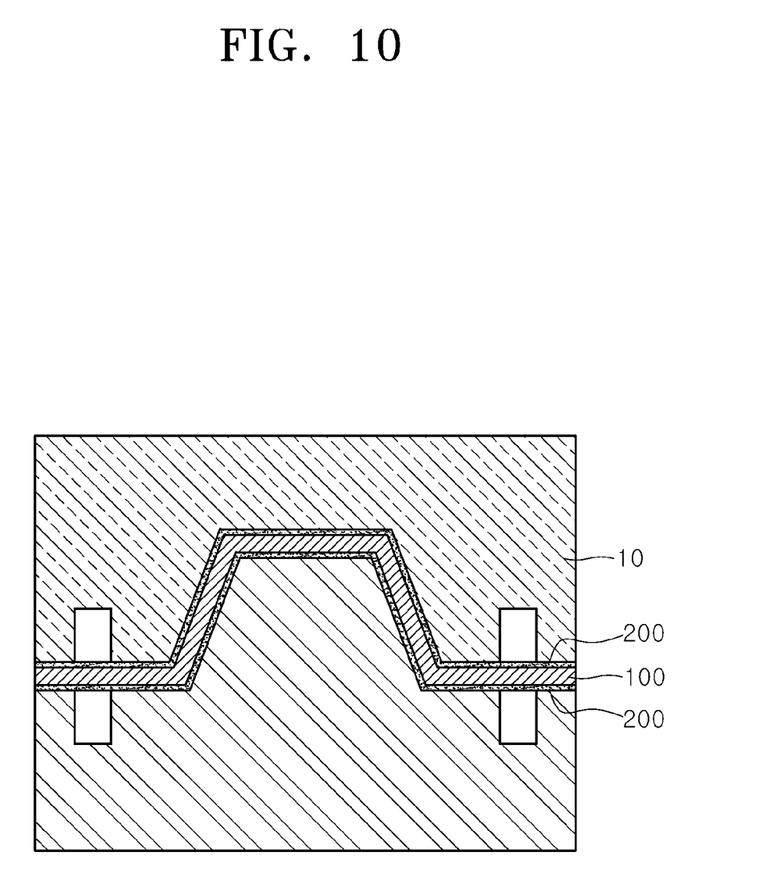

FIG. 10 illustrates a hot stamping device in accordance with another embodiment of the present invention.

Referring to FIG. 10, the above-described anti-sticking layer 200 may be formed on the surface of a die 10, and a cooling speed adjusting part 300 may be formed on the surface of the die 10 in order to cool the plating material 100 at a different speed from the die 10.

The cooling speed adjusting part 300 may block a direct contact between the die 10 and the plating material 100. Thus, even when the die 10 is rapidly cooled, the corresponding portion may be maintained in an air-cooled state, and have a relatively low cooling speed.

In other words, the portion where the cooling speed adjusting part 300 is formed may not be rapidly cooled unlike the die. Thus, the plating material 100 of the corresponding portion may have a relatively low tensile strength and high elongation.

The cooling speed adjusting part may be symmetrically formed on both surfaces of the material.

Figure 11:
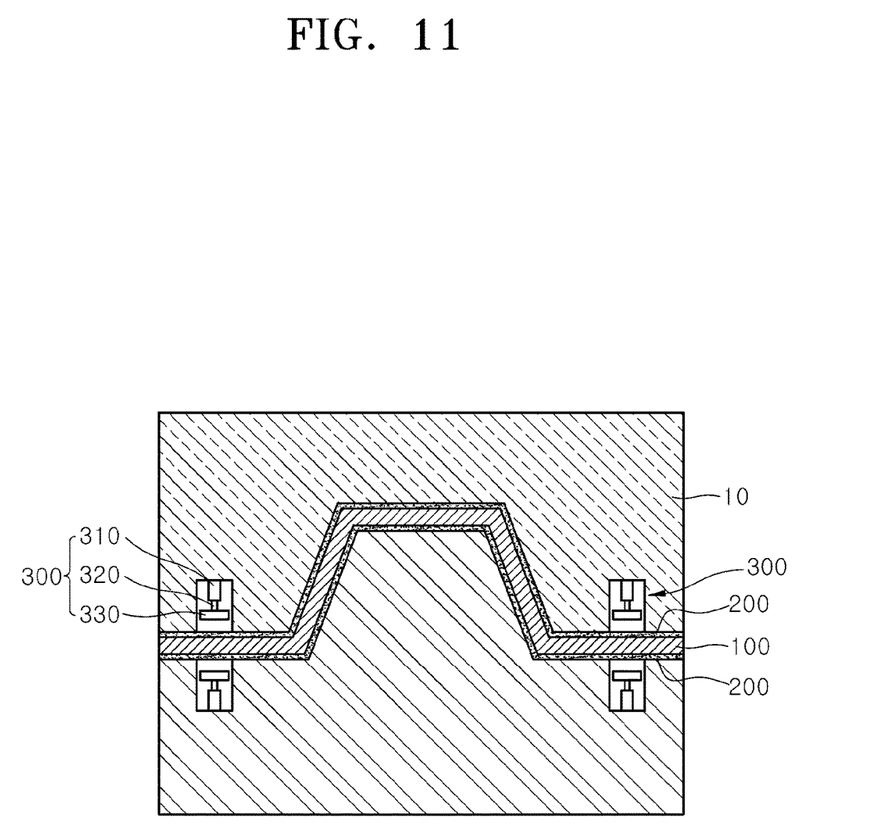

The cooling speed adjusting part 300 may be formed in a groove shape filled with air as illustrated in FIG. 10. As illustrated in FIG. 11, however, the cooling speed adjusting part 300 may include an opening/closing block 330 and a driving cylinder 320. The opening/closing block 330 may be moved upward/downward in the groove 310, and the driving cylinder 320 may move the opening/closing block 330 upward/downward.

The opening/closing block 330 may be moved in parallel to the surface of the die when the plating material 100 is formed, and form a stepped groove 310 when the plating material 100 is cooled.

As described above, when a product is formed by the hot stamping method using a plated steel sheet, it is possible to prevent plating from sticking to the die, thereby improving the quality of the product or part formed by the hot stamping method while preventing a defect of the formed product or part.

In particular, it is possible to prevent Al plating from sticking to a die during local-softening hot stamping, thereby preventing a defect remaining as a dent on the surface of a product or part formed after the hot stamping.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

The invention claimed is:

1. A hot stamping device comprising
a die for hot stamping a plating material,
wherein the die comprises an anti-sticking layer formed on a surface of the die disposed in contact with the plating material
wherein the die comprises an upper die disposed over the plating material and a lower die disposed under the plating material, with the plating material interposed therebetween, and the anti-sticking layer is formed by applying an anti-sticking agent onto one or more of a bottom surface of the upper die and a top surface of the lower die, and wherein the anti-sticking agent comprises 10-20 wt % of a methyl 2-phenyl propyl dodecyl methyl siloxane copolymer, 5-10 wt % of a C12-C14 secondary ethoxylated alcohol, and 75-85 wt % of water.

2. A hot stamping device comprising a for hot stamping a plating material, wherein the die comprises an anti-sticking layer formed on a surface of the die disposed in contact with the plating material, and a cooling speed adjusting part formed on a surface of the die in order to cool the plating material at a different speed from the die wherein the die comprises an upper die disposed over the plating material and a lower die disposed under the plating material, with the plating material interposed therebetween, the anti-sticking layer is formed by applying an anti-sticking agent onto one or more of a bottom surface of the upper die and a top surface of the lower die, and the cooling speed adjusting part is symmetrically formed on both surfaces of the plating material, wherein the anti-sticking agent comprises 10-20 wt % of a methyl 2-phenyl propyl dodecyl methyl siloxane copolymer, 5-10 wt % of a C12-C14 secondary ethoxylated alcohol, and 75-85 wt % of water.

3. A hot stamping method for preventing plating from sticking to a die, using the hot stamping device of claim 1, the hot stamping method comprising the steps of:

(a) blanking a plating material by cutting the plating material into predetermined sizes;

(b) treating the plating material by heating;

(c) forming an anti-sticking layer on the surface of a die disposed in contact with the plating material;

(d) hot forming and rapidly cooling the plating material, using the die having the anti-sticking layer formed thereon; and (e) trimming the formed product, wherein step (c) is performed before step (d).

4. The hot stamping method of claim 3, wherein in the step (c), the die comprises an upper die disposed over the plating material and a lower die disposed under the plating material, with the plating material interposed therebetween, and the anti-sticking layer is formed by applying an anti-sticking agent onto one or more of the bottom surface of the upper die and the top surface of the lower die.

5. The hot stamping method of claim 4, wherein the anti-sticking agent comprises 10-20 wt % of a methyl 2-phenyl propyl dodecyl methyl siloxane copolymer, 5-10 wt % of a C12-C14 secondary ethoxylated alcohol, and 75-85 wt % of water.

* * * * *